United States Patent [19]

Donner

[11] Patent Number: 5,666,182

[45] Date of Patent: Sep. 9, 1997

[54] SPECTACLES WITH WEIGHT BEARING CHEEK REST USING FLEXIBLE FRAME ATTACHMENT WITH A GROOVE

[75] Inventor: Irah H. Donner, Silver Spring, Md.

[73] Assignee: Donner, Inc., Silver Spring, Md.

[*] Notice: The term of this patent shall not extend beyond the expiration date of Pat. No. 5,506,638.

[21] Appl. No.: 626,404

[22] Filed: Apr. 2, 1996

Related U.S. Application Data

[63] Continuation-in-part of Ser. No. 115,545, Sep. 3, 1993, Pat. No. 5,506,638.

[51] Int. Cl.⁶ .................................................. G02C 3/00
[52] U.S. Cl. ........................... 351/155; 351/41; 351/158
[58] Field of Search ........................ 351/155, 41, 158, 351/140, 153, 47, 57, 123, 121, 110; 2/11

[56] References Cited

U.S. PATENT DOCUMENTS

| 3,495,898 | 2/1970 | Del Vecchio . | |
|---|---|---|---|
| 3,758,202 | 9/1973 | Chunga, Sr. | 351/155 |
| 3,832,043 | 8/1974 | Usdan | 351/123 |
| 3,955,885 | 5/1976 | Aronsohn | 351/155 |
| 5,164,749 | 11/1992 | Shelton | 351/47 |
| 5,506,638 | 4/1996 | Donner | 351/155 |

*Primary Examiner*—Hung X. Dang
*Attorney, Agent, or Firm*—Lowe, Price, LeBlanc & Becker

[57] ABSTRACT

Spectacles for wearing by a user include first and second lenses and first and second frame sections bearing the first and second lenses respectively. In addition, the spectacles include a bridge connected to the first and second frame sections, and first and second weight shift devices connected to the first and second frame sections respectively. The first and second weight shift devices transfer some of the weight of the spectacles to an area of the face of the user in addition to the nose.

10 Claims, 12 Drawing Sheets

SPECTACLES WITH WEIGHT BEARING CHEEK REST USING FLEXIBLE FRAME ATTACHMENT WITH A GROOVE

RELATED APPLICATIONS

This is a continuation-in-part of patent application Ser. No. 08/115,545 filed on Sep. 3, 1993 now U.S. Pat. No. 5,506,638.

BACKGROUND OF THE INVENTION

1. Field of the Invention

The present invention relates to the field of spectacles having weight bearing cheek rest, and in particular, to the field of spectacles where the user of the spectacles is unable to use the nose to substantially support the spectacles for various reasons, such as the user has recently undergone nose surgery.

2. Description of the Related Art

Presently, spectacles have been unable to accommodate the situation where a person has a sensitive nose, for various reasons, and is unable to comfortably rest the nose bridge of the spectacles on their nose because the nose bridge usually carries the major weight of the spectacles. Thus, a person with a sensitive nose which is unable to burden the weight of heavy spectacles must refrain from wearing the spectacles. This problem is also extended to the are of shaded glasses as well where a person not requiring corrective spectacles may still have the desire to wear shaded glasses to protect their eyes from bright conditions or obnoxious glare. Accordingly, a person with a sensitive nose has also been unable to wear shaded spectacles.

The prior art spectacles have not addressed this above problem to design spectacles where some, a substantial portion or all of the weight of the spectacles is not supported via a nose rest, but is supported using other means, to permit the person with a sensitive nose to wear corrective glasses or shaded glasses. For example, the prior art teaches makeup spectacles which are designed to permit the wearer requiring corrective lenses to apply makeup to one eye while looking through a corrective lens using the other eye. This system permits the user to apply the makeup while wearing corrective lenses. However, the problem of providing spectacles where some of the weight is not rested on the nose has not been described. Further, the prior art has not provided spectacles for people with sensitive noses.

Thus, it is desirable that spectacles be provided which will allow a person with a sensitive nose to wear the spectacles.

It is also desirable to provide spectacles which instead of applying the weight of the spectacles on the nose for support, apply a substantial portion of the weight of the spectacles to areas other than the nose, such as the area of the cheek.

It is also desirable to provide the above spectacles as unshaded or shaded spectacles.

In addition, it is desirable to minimize the cost of providing the above spectacles by also providing an optional attachment that transfers a substantial portion of the weight of the spectacles from an ordinary pair of spectacles to the attachment which transfers the weight to an area which is different than the nose.

SUMMARY OF THE INVENTION

It is, therefore, an object of the present invention to provide spectacles which will allow a person with a sensitive nose to wear the spectacles.

It is also an object of the present invention to provide spectacles which instead of applying the weight of the spectacles on the nose for support, apply a substantial portion of the weight of the spectacles to areas other than the nose, such as the area of the cheek.

It is also an object of the present invention to provide the above spectacles as unshaded or shaded spectacles.

It is another object of the present invention to provide the above spectacles where the device which transfers some, a substantial portion or all of the weight of the spectacles to areas of the face other than the nose is non-obtrusive and positioned where the weight transfer device is minimally visible to others.

Further, it is an object of the present invention to minimize the cost of providing the above spectacles by also providing an optional attachment that transfers a substantial portion of the weight of the spectacles from an ordinary pair of spectacles to the attachment which then transfers the weight to an area which is different than the nose.

To achieve these and other objects, the present invention provides spectacles having a weight for wearing by a user having a face and a nose. The spectacles include first and second lenses and first and second frame sections bearing the first and second lenses respectively. In addition, the spectacles include a bridge connected to the first and second frame sections, and first and second weight shift devices connected to the first and second frame sections respectively. The first and second weight shift devices transfer some of the weight of the spectacles to an area of the face of the user in addition to the nose.

In another embodiment of the present invention, a spectacle weight shift device is provided for transferring weight of spectacles supported by a user having a face and a nose. The spectacles having first and second lenses and a frame having a bridge. The spectacle weight shift device includes a frame attachment and first and second weight shift devices connected to the frame attachment. The first and second weight shift devices transfer some of the weight of the spectacles to an area of the face of the user in addition to the nose. In addition, connection means is provided for connecting the frame attachment to the spectacles such that the spectacles do not require permanent modification for using the spectacle weight shift device.

These together with other objects and advantages which will be subsequently apparent, reside in the details of construction and operation as more fully hereinafter described and claimed, with reference being had to the accompanying drawings forming a part hereof, wherein like numerals refer to like elements throughout.

DETAILED DESCRIPTION OF THE PREFERRED EMBODIMENTS

Figure 1:
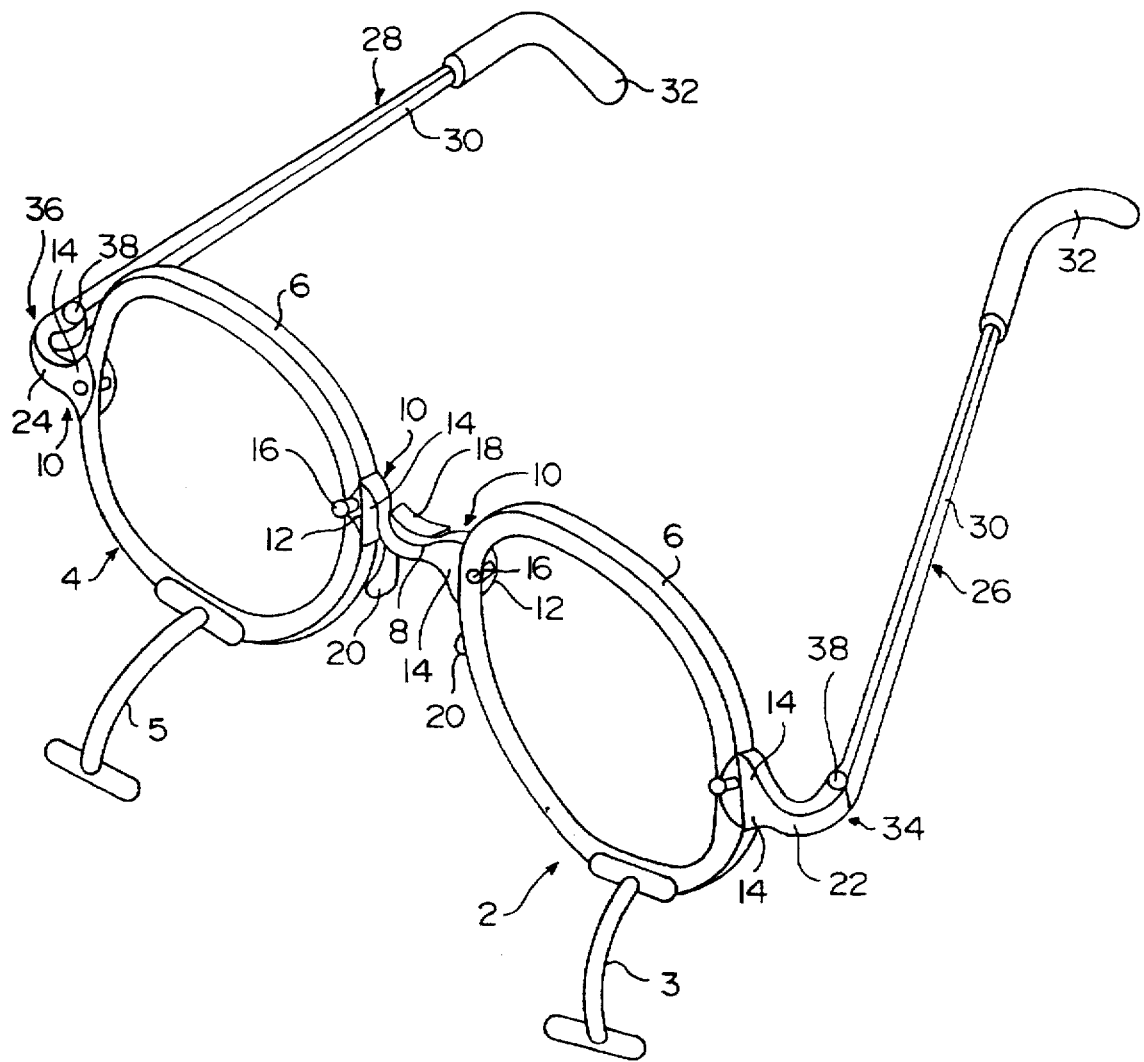
FIG. 1 is a diagram of a first embodiment of the weight transfer device of the present invention as used with spectacles.

FIG. 1 is a diagram of a first embodiment of the weight transfer device of the present invention as used with spectacles. In FIG. 1, the spectacles illustrated are comprised of two correcting lenses 2 and 4 made of plastic or mineral glass. Each one of these two lenses 2 and 4 are inserted in frames 6 holding and defining the perimeter shape of the lens.

Between areas facing one another of the two lenses 2 and 4 is situated a bridge 8, which is equipped at each of its two ends with a fastening device 10. The two fastening devices 10 serve the purpose of connecting the bridge with the frame sections 6 holding each of the two lenses 2 and 4. Each of the two fastening devices 10 are comprised of a shank 12 arranged on the back side of frames 6, and the lenses 2 and 4, and a support segment 14, which extends along a stretch on the edge of frames 6. The shank 12 and the support segment 14 of each fastening device 10 are formed in one piece with the bridge 8. An element 16, in the form of a pin, runs through a hole, not shown, in the frames 6 and is thickened on its front side in the shape of a ball; with this ball-shaped thickening it reposes in an analogous widening of the hole of the front side of each respective lens and is connected on the back side of the lens firmly with the shank 12. In this manner the pin-shaped element 16 may firmly retain the frames 6 on the shank 12 and on the support segment 14.

On the bridge 8, a bridge mounting (not shown) is attached which merges downward into two side bridges 20. The two side bridges 20 have the task of supporting the spectacles on the nose of the wearer of the spectacles, and positioning the spectacles in the appropriate place on the face for obtaining proper corrective viewing. In addition to side bridges 20, the present invention also includes weight transfer devices 3 and 5 which are used to transfer the weight of the spectacles from falling directly on the nose through side bridges 20 to other areas of the face. In this first embodiment of the present invention, weight transfer devices 3 and 5 are attached to frames 6 at the lower end and in front. Weight transfer devices 3 and 5 are preferably shaped toward the rear of the spectacles which is toward the face of the spectacle wearer. In this manner, weight transfer devices 3 and 5 contact the face, particularly in this embodiment the area of the cheeks, and transfer some, a substantial portion or all of the weight of the spectacles from the nose to the cheek area of the face.

While weight transfer devices 3 and 5 are shown in FIG. 1 to be attached to the lower end of frames 6 of the spectacles, weight transfer devices 3 and 5 may also be positioned on other areas of frames 6 where some of the weight of the spectacles may be transferred to the face of the wearer of the spectacles. In addition, while weight transfer devices 3 and 5 are shown in FIG. 1 to transfer the weight of the spectacles to the cheek area of the face of the wearer, weight transfer devices 3 and 5 may also be positioned to transfer some of the weight of the spectacles to other areas of the face as well.

On the side of any one of the frame 6 and two lenses 2 and 4 facing away from the bridge 8, hinge pieces 22 and 24 have been arranged, on which one shackle toggle each has been formed. In addition, a fastening device 10 has been formed in one piece with each of the two hinge pieces 22 and 24 and these may be similar in form with the two fastening devices 10 on the bridge 8. The fastening devices 10 on the hinge pieces 22 and 24 reposes each with their support segments 14 on the edge 10.

Each of the two hinges 22 and 24 are connected with a temple 26 and 28, respectively in the joints of hinges 22 and 24. Each of the two temples 26 and 28 include a longitudinally extended temple shaft 30 and a temple end piece 32, which is connected with the back end of each respective temple end 30 and serves the purpose of going behind the ear of the spectacle wearer to fit against the skull and/or ear, and thus, to secure the spectacles in position.

On the front end of each of the temples 26 and 28 a further shackle toggle joint, not shown, may be formed which, together with the two shackle toggle joints, not shown, of the adjoining hinge pieces 22 and 24, forms hinges 34 and 36, where a hinge bolt 38 belonging to each of the hinges 34 and 36 is inserted. Hinge bolt 38 can be, for example, a hinge screw or hinge rivet.

In the lower of the two shackle toggle joints formed on hinge pieces 22 and 24, a circumferential slot has been formed, into which a torus is snapped. In this manner the hinge bolt 38, such as a rivet, is secured against unintentional loosening. This simple type of securing the hinge bolt is made possible, just as is the connection explained above between the temple end piece 32 and the temple shaft 30, by using a plastic material for the temple end piece 32 and the temple shaft 30 as well as for hinge pieces 22 and 24.

From the above description, it is apparent that the spectacles are basically constructed in the manner of a traditional metal-fitting spectacles or glass spectacles with the exception of weight transfer devices 3 and 5 being attached to frames 6 of the spectacles. In addition to weight transfer devices 3 and 5 being attached to frames 6, weight transfer devices 3 and 5 may also, for example, be attached directly to lenses 2 and 4 for frameless spectacles or to hinges 22 and 24. Thus, any area of the spectacles is contemplated by the present invention as long as some of the weight of the spectacles may be transferred from the nose to a different area of the face.

Figure 2:
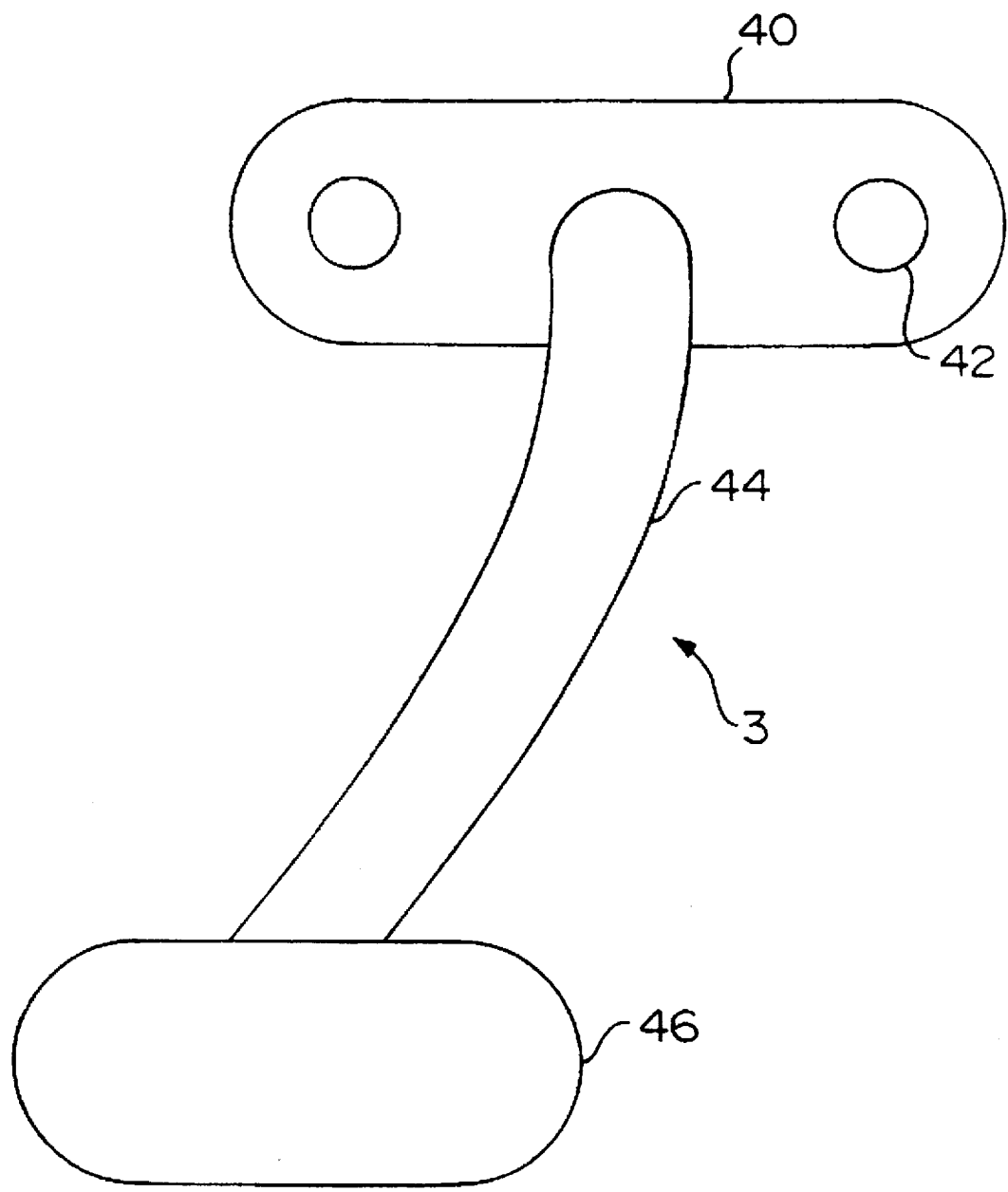
FIG. 2 is a detailed diagram of the first embodiment of the weight transfer device of the present invention.

FIG. 2 is a detailed diagram of the first embodiment of the weight transfer device of the present invention. In FIG. 2, weight transfer device 3 includes base 40 for attachment to frames 6 via attachment mechanism 42. Attachment mechanism 42 may be, for example, a screw which directly attaches to frames 6, or a bolt and nut arrangement where the bolt is inserted through base 40 and frames 6 and the nut secures frames 6 to base 40.

Elongated and curved portion 44 is attached to base 40 via conventional means, such as being welded or molded from the same material. Elongated and curved portion 44 is also connected to facial contact 46 in a similar manner as to base 40. Facial contact 46 is used to contact the face, and thereby transfer the weight of the spectacles from the nose via side bridges 20 to a different area of the face, such as the cheek portion of the face. Accordingly, weight transfer devices 3 and 5 of the present invention transfers some, a substantial portion or even all the weight of the spectacles from the nose to a different area of the face, such as the cheek portion of the face.

Weight transfer devices 3 and 5 may also be positioned on the side of frames 6 which is toward the wearer, and thus, is somewhat hidden from sight by onlookers. In addition, weight transfer devices 3 and 5 may also be hinged so that weight transfer devices 3 and 5 may be folded up and hidden from view when not in use. Weight transfer devices 3 and 5 may also be used with spectacles that are shaded for protection from the sun, or weight transfer devices 3 and 5 may also be used with clip on shades that clip on to spectacles for shading the wearer's eyes from the sun. Further, since weight transfer devices 3 and 5 do not obstruct the front of the spectacles, clip on shaded lenses may be used with spectacles incorporating the features of the present invention.

Figure 3:
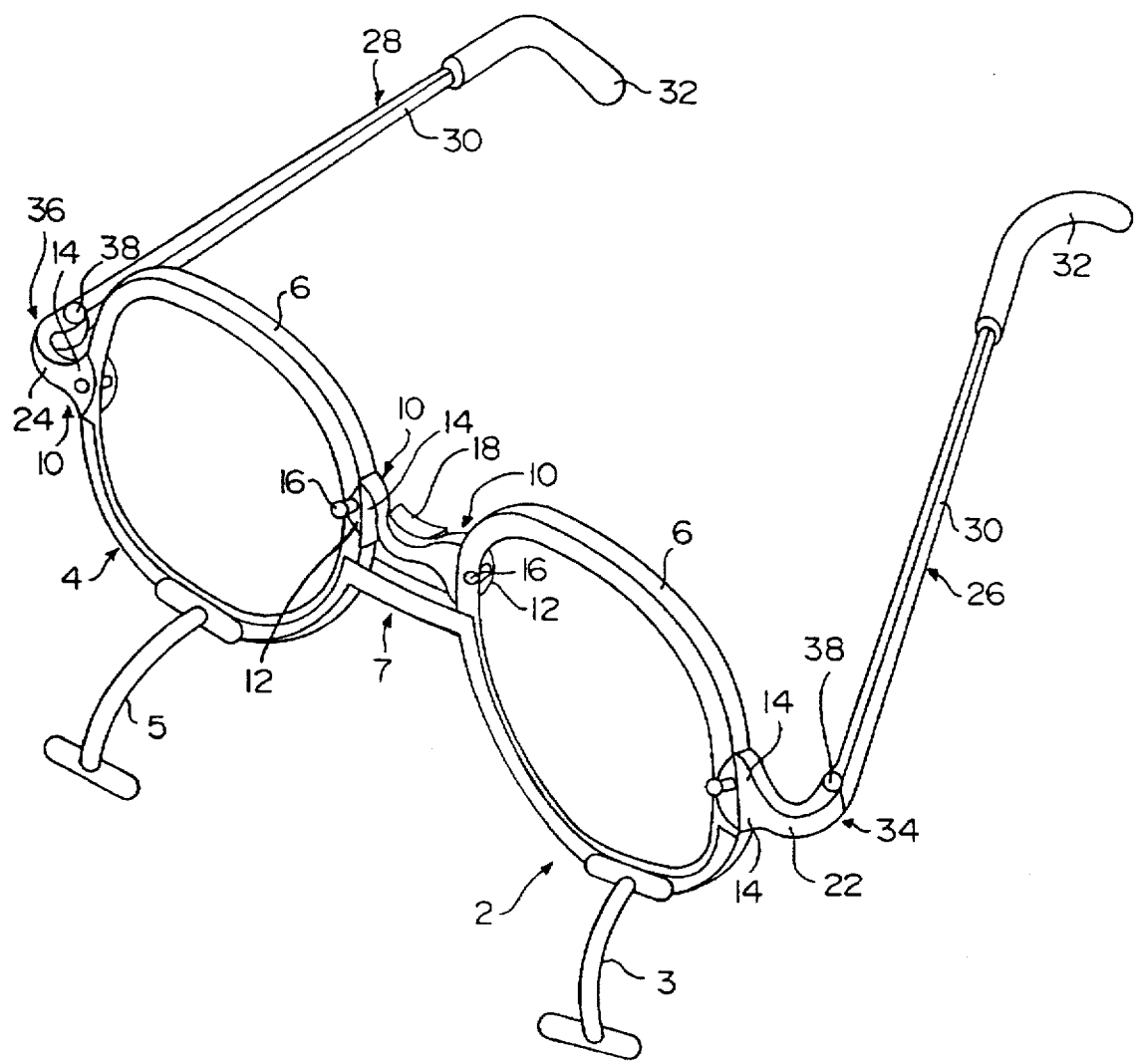
FIG. 3 is a diagram of a second embodiment of the weight transfer device of the present invention as used with spectacles.

FIG. 3 is a diagram of a second embodiment of the weight transfer device of the present invention as used with spectacles. In FIG. 3, the same reference numerals are used to indicate like parts as referred to in FIG. 1. Accordingly, only the different parts illustrated in FIG. 3 will be discussed. As shown in FIG. 3, weight transfer devices 3 and 5 are connected to frame attachment 7 instead of being directly connected to frames 6. Frame attachment 7 is then attached to the spectacles in a manner which permits attachment/removal without requiring permanent changes to the spectacles (not shown in FIG. 3). Accordingly, when a spectacle wearer is unable to wear ordinary spectacles due to a sensitive nose, the wearer is not required to purchase special spectacles or even modify their existing spectacles in a permanent manner. Rather, the spectacle wearer need only purchase the frame attachment 7 with weight transfer devices 3 and 5 which may then be connected to the spectacles in a non-permanent manner discussed below.

Figure 4:
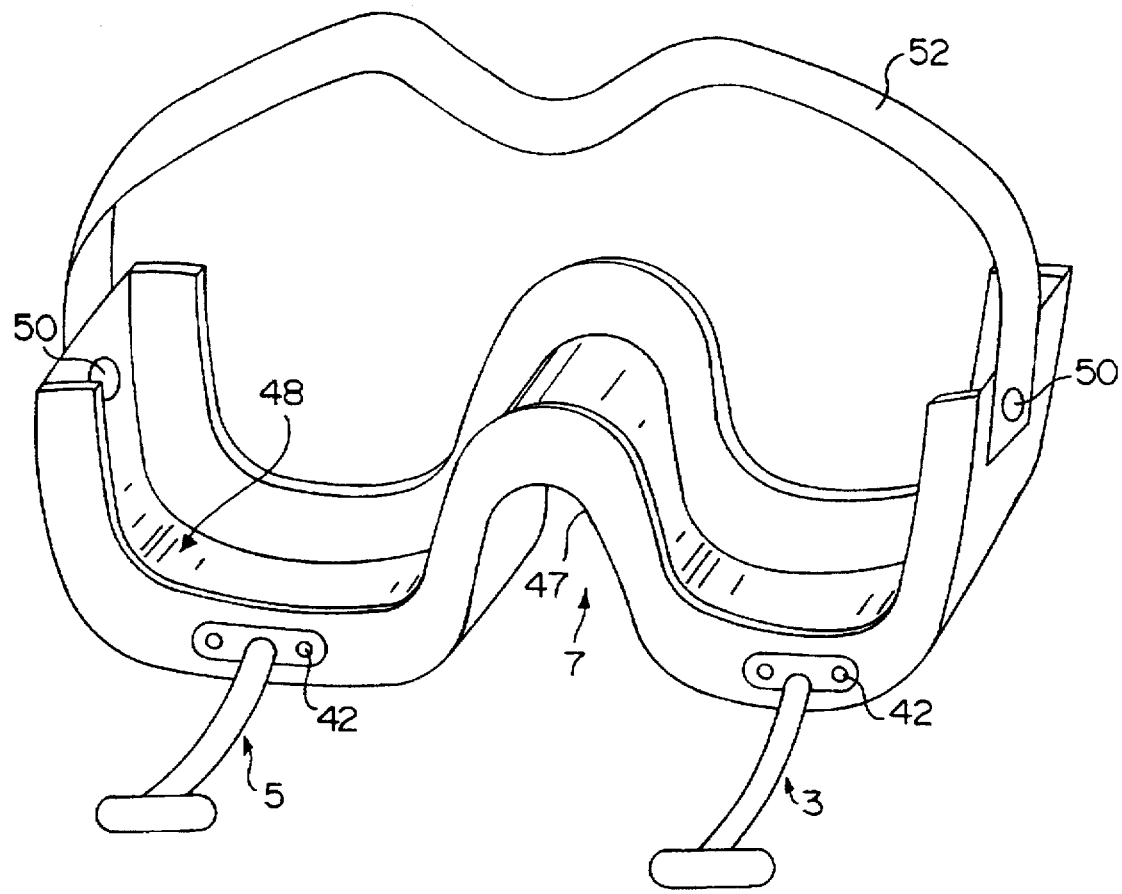
FIG. 4 is a detailed diagram of the second embodiment of the weight transfer device of the present invention.

FIG. 4 is a detailed diagram of the second embodiment of the weight transfer device of the present invention as attached to the spectacles to permit the weight transfer device to be used by the spectacle wearer at will, without requiring any modification or permanent alteration to the spectacles. In FIG. 4, weight transfer devices 3 and 5 are directly attached via attachment mechanism 42 to frame attachment 7. Frame attachment 7 preferably includes spectacle support 47 having a cavity 48 for inserting frames 6 of the spectacles.

In addition, spectacle support 47 of frame attachment 7 also preferably includes securing device 50 connected to band 52. As shown in FIG. 4, band 52 is positioned to secure frame attachment 7 to frames 6 of the spectacle in a plane which is parallel to the spectacles by wrapping around, for example, hinge pieces 22 and 24 and, perhaps, the top of frames 6. Alternatively, instead of the securing attachment 50 being located on the side of spectacle support 47 so that band 52 is in the same plane as frames 6, securing attachment 50 may include a series of attachments located on the front and back of spectacle support 47. Accordingly, several bands would be used, and the bands would be positioned in a perpendicular manner with respect to frames 6 to secure the frame attachment 7 to the spectacles.

Figure 5:
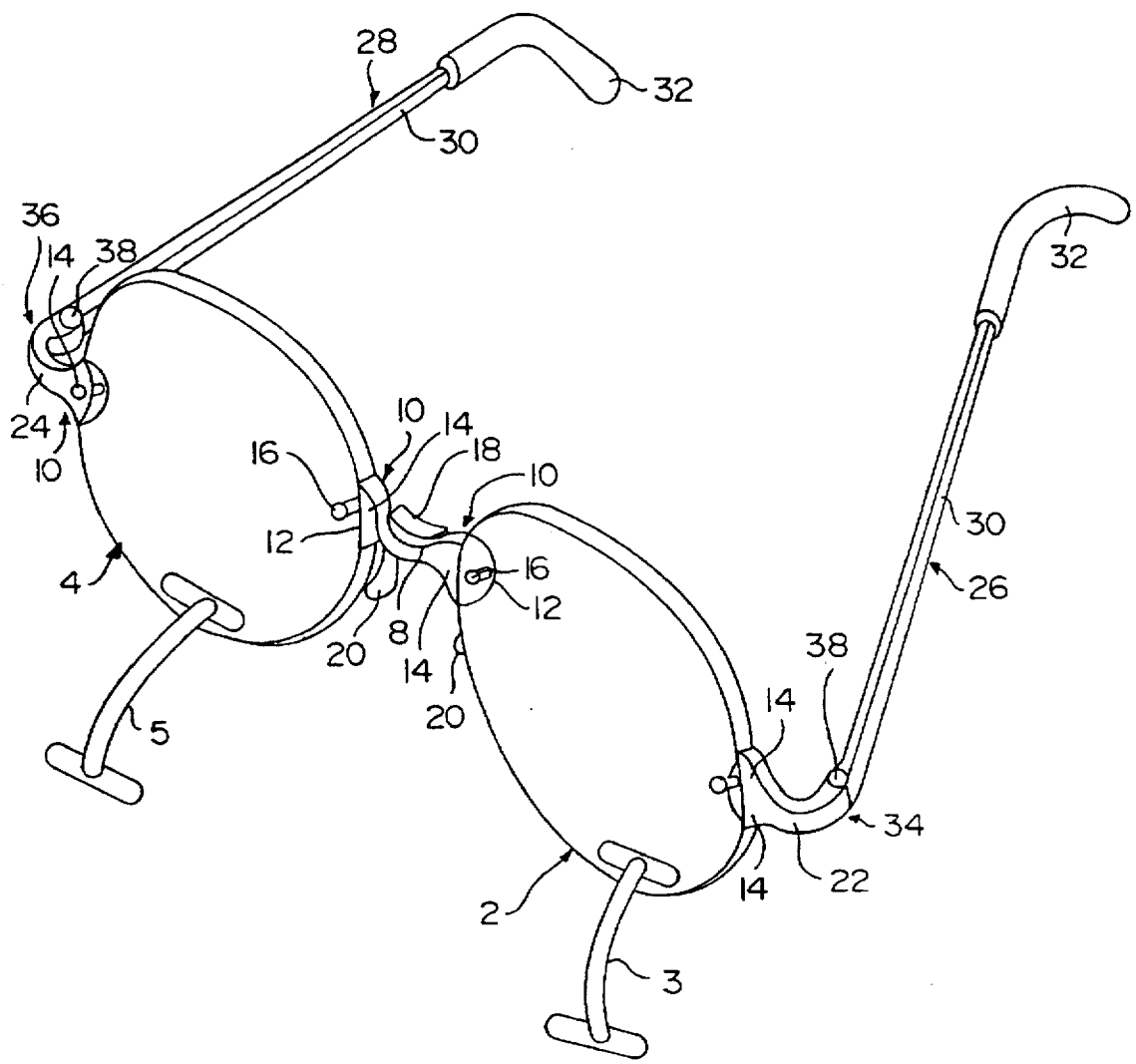
FIG. 5 is another embodiment of the weight transfer device connected directly to the lenses of the spectacles.

FIG. 5 is another embodiment of the weight transfer device connected directly to the lenses of the spectacles. In FIG. 5, the spectacles are similar to the spectacles described in FIG. 1 with the exception that the weight shift devices 3 and 5 are connected directly to lenses 2 and 4, respectively.

Figure 6:
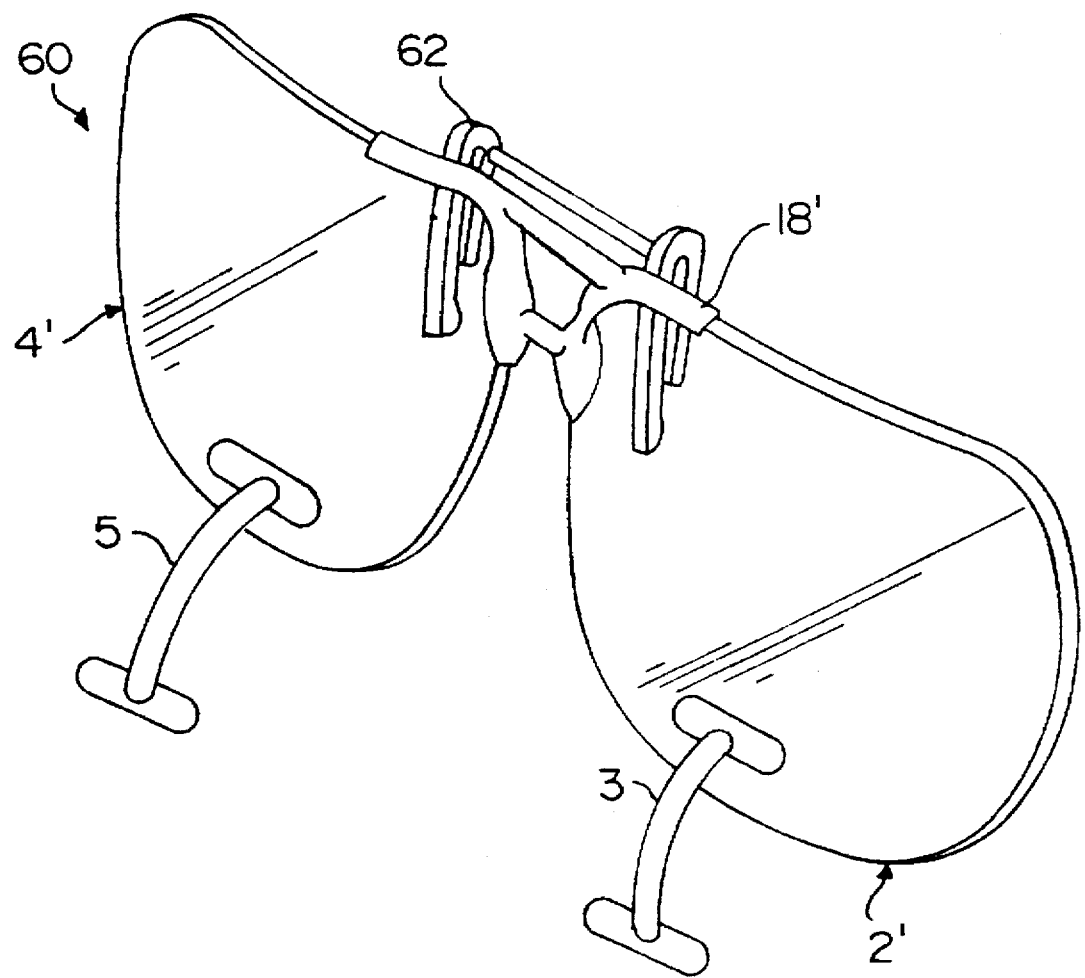
FIG. 6 is another embodiment of the weight transfer device connected directly to the lenses of the spectacles which are shaded lenses to be clipped to other spectacles.

FIG. 6 is another embodiment of the weight transfer device connected directly to the lenses of the spectacles which are shaded lenses to be clipped to other spectacles. In FIG. 6, weight shift devices 3 and 5 are connected to shaded lenses 2' and 4', respectively of shaded spectacles 60. Shaded spectacles 60 includes bridge 18' which is connected to clipping device 62. Clipping device 62 is then connected to other spectacles for providing protection for the eyes from ultraviolet rays as well as providing the weight shift transfer function provided by weight shift devices 3 and 5.

Figure 7:
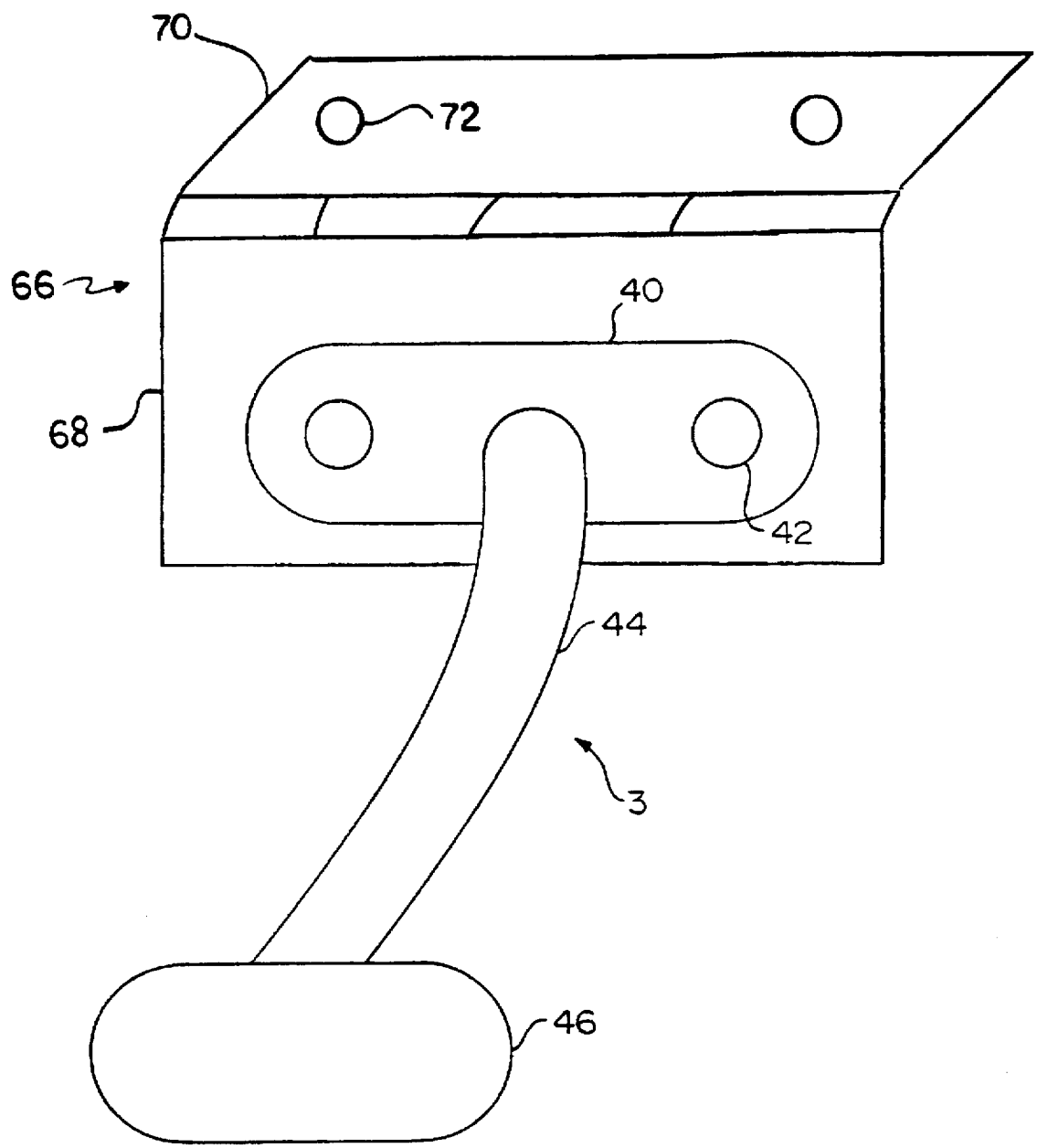
FIG. 7 is an illustration of the weight transfer devices including a hinge for attachment to the frame section or frame of the spectacles.

FIG. 7 is an illustration of the weight transfer devices including an exemplary hinge as discussed for attachment to the frame section or frame of the spectacles. As shown in FIG. 7, hinge 66 is attached to weight shift device 3 via first panel 68 and screws inserted therethrough and through holes 42. The second panel 70 of hinge 66 includes screw holes 72 for inserting a screw therethrough for attachment to the frame section of the spectacles or the spectacles.

Figure 8:
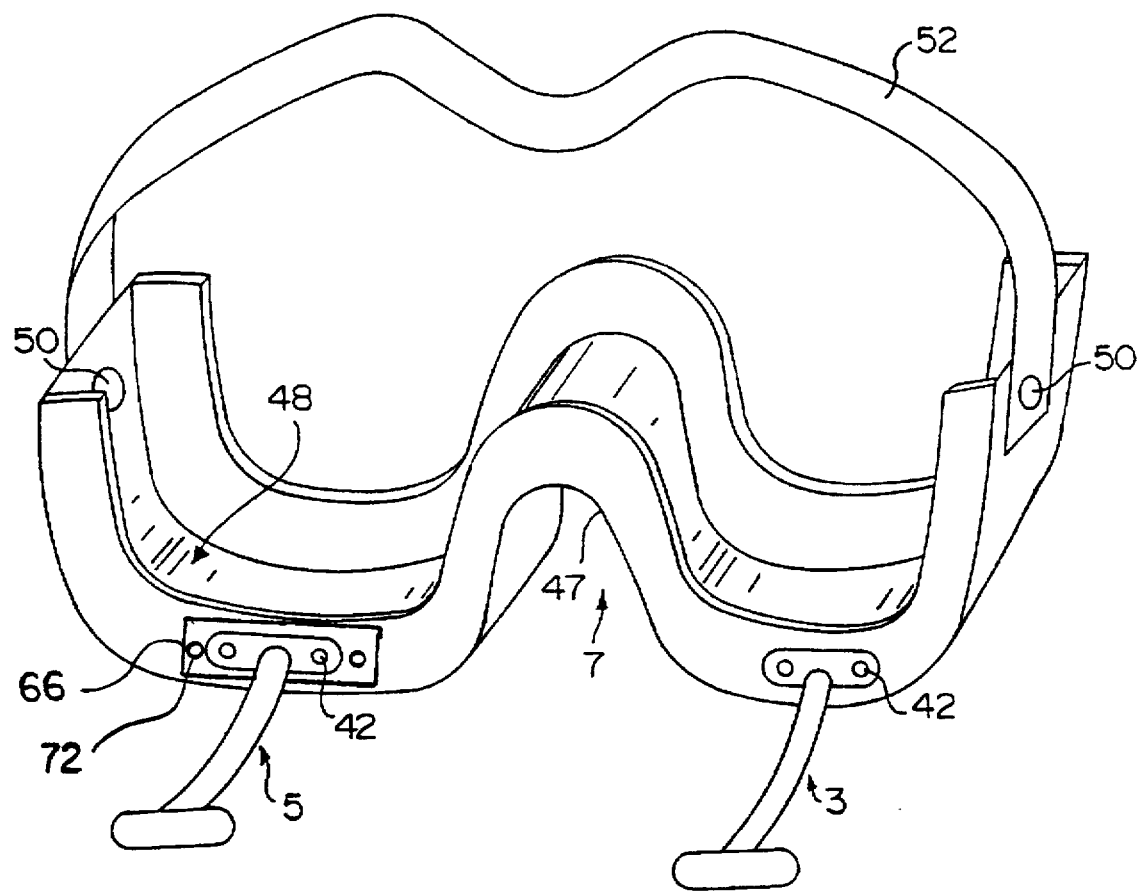
FIGS. 8–9 illustrates another embodiment of the weight transfer device utilizing the hinge illustrated in FIG. 7.
Figure 9:
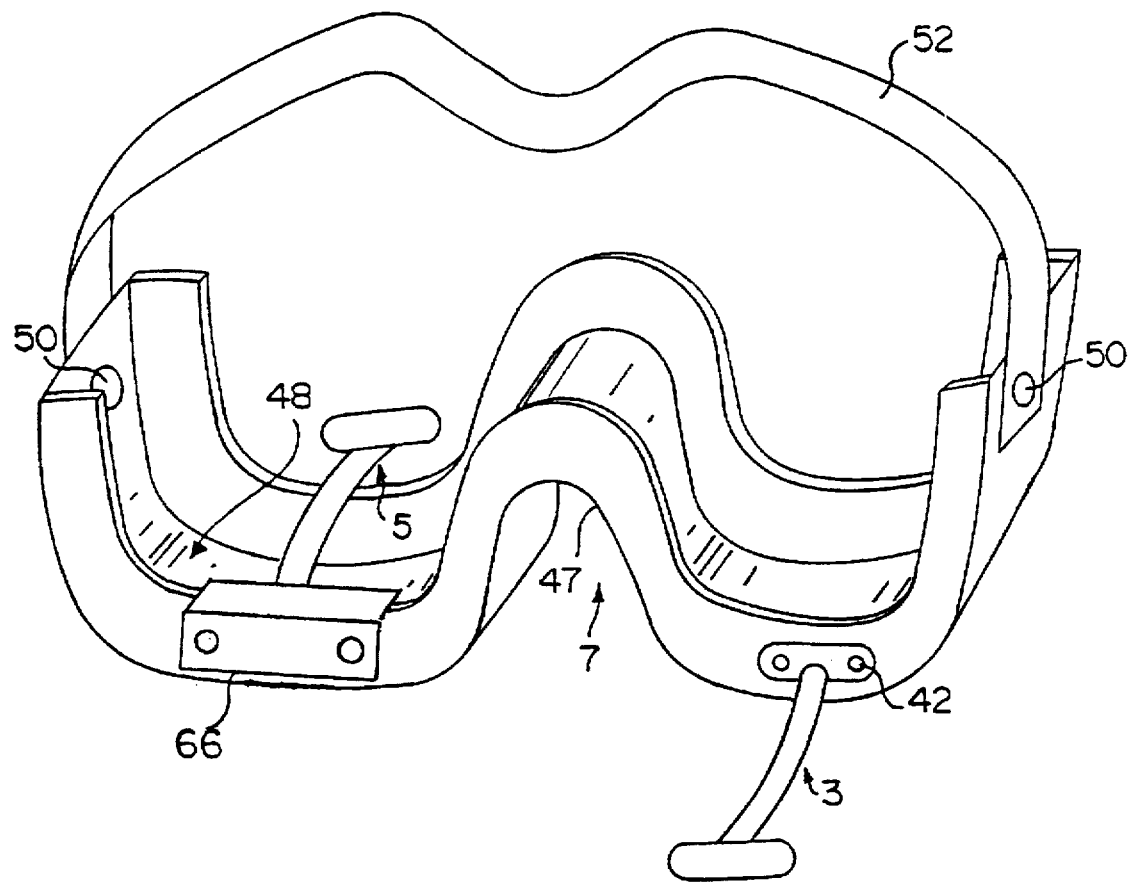

FIGS. 8–9 illustrates another embodiment of the weight transfer device utilizing the hinge illustrated in FIG. 7. In FIGS. 8–9, weight shift devices 3 and 5 are connected to frame section 7 via hinge 66.

Figure 10:
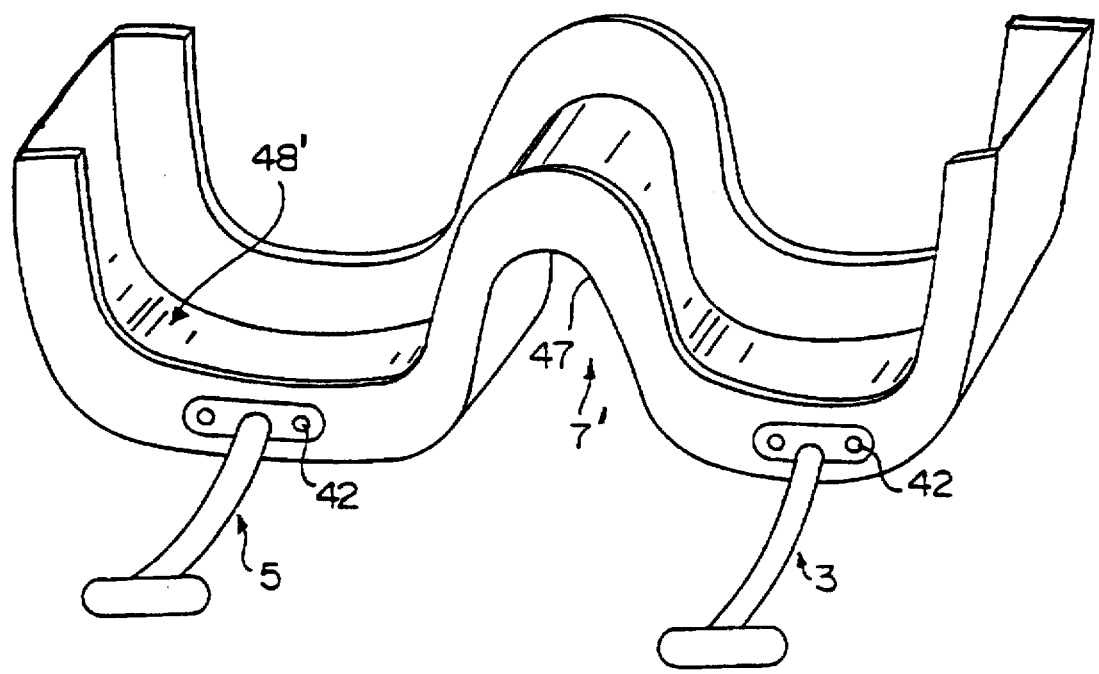
FIG. 10 is another embodiment of the weight transfer device.

FIG. 10 is another embodiment of the weight transfer device. FIG. 10 illustrates that modified frame section 7' is constructed in such a manner that groove 48' grips or clutches the glass frame or lens when inserted therein. This is accomplished by making frame section 7' out of a flexible material or plastic, and making groove 48' small enough such that it must be stretched to accept the frame or lens when inserted therein. Thus, a snug fit is created so that the lens or frame does not slip out of frame section 7'.

Figure 11:
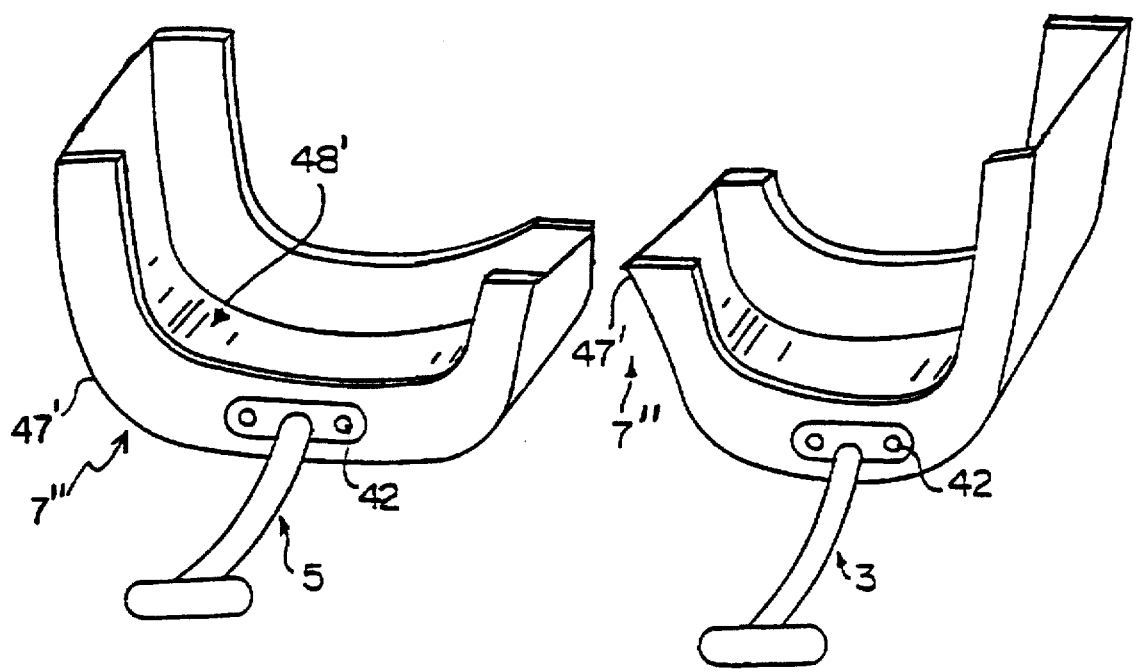
FIG. 11 is another embodiment of the weight transfer device.

FIG. 11 is another embodiment of the weight transfer device. FIG. 11 illustrates a modified frame section 7" which is segregated into two separate pieces. Frame section 7" is constructed, for example, of a similar material and form as frame section 7'.

Figure 12:
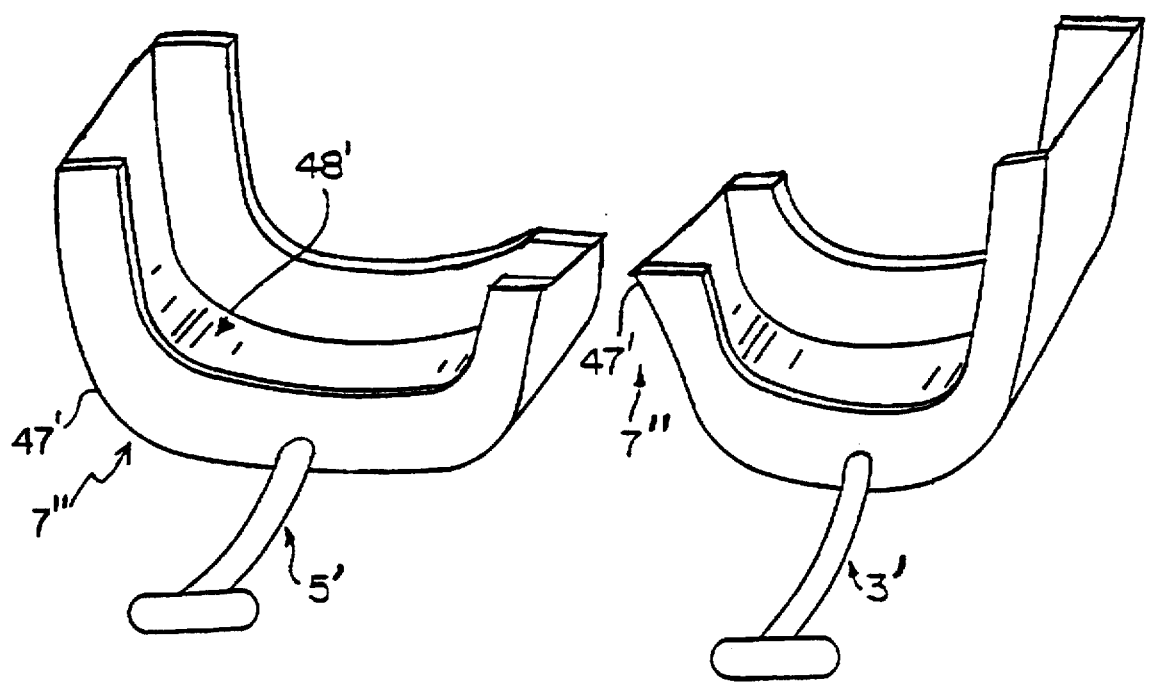
FIG. 12 is another embodiment of the weight transfer device.

FIG. 12 is another embodiment of the weight transfer device. FIG. 12 illustrates a modified frame section 7" which is segregated into two separate pieces with modified weight shift devices 3' and 5'. Frame section 7" is constructed, for example, of a similar material and form as frame section 7'.

While alternative methods have been specified which detail the attachment of frame attachment 7 to the spectacle in a manner which permits removal of frame attachment 7 at the wearers will and does not require permanent adaptation of the spectacles, other methods accomplishing similar results are also considered within the scope of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A spectacle weight shift device transferring weight of spectacles supported by a user having a face and a nose, the spectacles having first and second lenses and a frame having a bridge, said spectacle weight shift device comprising:

a frame attachment;

first and second weight shift devices connected to said frame attachment, transferring some of the weight of the spectacles to an area of the face of the user in addition to the nose, wherein said frame attachment is comprised of a flexible material and includes a stretchable groove, the stretchable groove is constructed to removably grip the spectacles, and the spectacles are inserted in the stretchable groove such that the spectacles do not require permanent modification for using the spectacle weight shift device.

2. A spectacle weight shift device according to claim 1, wherein the lenses of the spectacles are corrective lenses.

3. A spectacle weight shift device according to claim 1, wherein the lenses of the spectacles are shaded lenses.

4. A spectacle weight shift device according to claim 1, wherein the spectacle weight shift device may be folded up when not in use.

5. A spectacle weight shift device according to claim 1, wherein the spectacles are disposed on to other spectacles.

6. A method of transferring weight of spectacles supported by a user having a face and a nose using a spectacle weight shift device, the spectacle weight shift device including a frame attachment comprised of a flexible material, the frame attachment includes a stretchable groove, the stretchable groove is constructed to removably grip the spectacles, and the spectacles are inserted in the stretchable groove such that the spectacles do not require permanent modification for using the spectacle weight shift device said method comprising the steps of:

(a) providing first and second weight shift devices on the spectacles; and (b) transferring some of the weight of the spectacles to an area of the face of the user in addition to or instead of the nose.

7. A method according to claim 6, wherein the lenses of the spectacles are corrective lenses.

8. A method according to claim 6, wherein the lenses of the spectacles are shaded lenses.

9. A method according to claim 6, wherein the spectacle weight shift device may be folded up when not in use.

10. A method according to claim 6, wherein the spectacles are disposed on to other spectacles.

* * * * *